United States Patent
Spio

(10) Patent No.: US 9,645,648 B2
(45) Date of Patent: May 9, 2017

(54) AUDIO COMPUTER SYSTEM FOR INTERACTING WITHIN A VIRTUAL REALITY ENVIRONMENT

(71) Applicant: Mary A. Spio, Miami Beach, FL (US)

(72) Inventor: Mary A. Spio, Miami Beach, FL (US)

( * ) Notice: Subject to any disclaimer, the term of this patent is extended or adjusted under 35 U.S.C. 154(b) by 13 days.

(21) Appl. No.: 14/859,143

(22) Filed: Sep. 18, 2015

(65) Prior Publication Data
US 2016/0085305 A1    Mar. 24, 2016

Related U.S. Application Data

(60) Provisional application No. 62/052,430, filed on Sep. 18, 2014.

(51) Int. Cl.
| | |
|---|---|
| *H04R 5/02* | (2006.01) |
| *G06F 3/01* | (2006.01) |
| *G06F 3/16* | (2006.01) |
| *G06F 1/16* | (2006.01) |
| *G09G 5/00* | (2006.01) |

(52) U.S. Cl.
CPC .............. *G06F 3/016* (2013.01); *G06F 1/169* (2013.01); *G06F 1/1698* (2013.01); *G06F 3/167* (2013.01)

(58) Field of Classification Search
CPC . G06T 19/006; G06T 19/003; G06T 2200/04; G06T 19/20; G06T 11/60; G06T 17/00; G06T 15/00; G02B 27/017; G02B 27/0172; G02B 2027/0138; G02B 2027/0178; G02B 27/0093; G02B 27/01; G02B 2027/0185; G06F 3/011; G06F 3/017; G06F 3/012; G06F 3/013; G06F 3/016; G06F 3/0482; G06F 3/04842; G06F 3/0304; G06F 3/04845; G06F 3/04815; G06F 3/165; G06F 3/16; G06F 3/167; H04R 5/033
USPC ..... 381/119, 110, 17, 26, 310, 309, 18, 306, 381/61; 345/633, 156, 634
See application file for complete search history.

(56) References Cited

U.S. PATENT DOCUMENTS

| | | | | |
|---|---|---|---|---|
| 6,038,330 | A * | 3/2000 | Meucci, Jr. | .......... H04R 1/1075 345/8 |
| 6,215,498 | B1 * | 4/2001 | Filo | .......... G06F 3/011 345/419 |
| 2010/0034404 | A1 * | 2/2010 | Dent | .......... H04R 5/02 381/310 |

(Continued)

*Primary Examiner* — Paul S Kim
*Assistant Examiner* — Norman Yu

(57) ABSTRACT

A computer system comprising a headset configured to sit on top of a user's head. The headset includes a microphone and a headset haptic device. The headset is configured to receive audio signals and for outputting a plurality of sound waves based on the audio signals received. The computer system also includes a sound processing module configured for receiving a plurality of sound data corresponding with a sound profile associated with a virtual reality environment and converting the sound data so that sound can be emitted from a sound emitting device of the headset. The headset haptic device is configured for converting audio signals into a haptic profile corresponding to the sound profile and transmitting vibrations corresponding with the haptic profile from the headset haptic device through the headband to the crown of the user's skull and from each ear cup to the skull around each user's ears.

20 Claims, 11 Drawing Sheets

(56) References Cited

U.S. PATENT DOCUMENTS

2013/0236040 A1* 9/2013 Crawford ............... H04S 7/304
381/310

* cited by examiner

AUDIO COMPUTER SYSTEM FOR INTERACTING WITHIN A VIRTUAL REALITY ENVIRONMENT

CROSS-REFERENCE TO RELATED APPLICATIONS

This patent application claims priority to provisional application No. 62/052,430 filed Sep. 18, 2014. The subject matter of provisional application No. 62/052,430 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to the field of audio headsets, and more specifically, audio headsets utilized with virtual reality environments.

BACKGROUND

Virtual reality is one method in which people use computers and technology to interact or socialize with others. Virtual reality is a computer-generated simulation of a two or three-dimensional image or environment that can be interacted with by a person using special electronic equipment, such as a helmet with a screen inside or other devices filled with sensors. Users also use other computer systems which include traditional speakers and surround sound speakers. Often, individuals believe that virtual reality environments seem unrealistic. One of the reasons people find virtual reality environments unrealistic is that the sound emitting from the virtual reality environments is unrealistic because of the lack of depth perception and perspective associated with the sound. Because of the unrealistic nature of the sound, many people do not find virtual reality environments enjoyable.

Traditional headsets or headphones use a two dimensional perspective or fixed directional transfer of sound waves. One problem with traditional headsets in virtual reality environments is that the two dimensional perspective or fixed directional transfer of sound waves makes the headphones limited in enabling a listener to locate the source of the sound. Another problem with traditional headsets is that the sound does not adjust based upon the movement of a user's avatar within virtual reality environments. With the prior art, the level of audio capability and quality required currently require powerful high performance gaming computers and CPU resources that are difficult to achieve on standard computers or mobile phones. In addition, traditional headphones are designed for discrete predefined scenarios, not real-time dynamic lifelike experiences, thus the level of immersion within a virtual reality or augmented reality environment is less effective.

Therefore, a need exists for improvements over the prior art. There is also a need for methods and systems that make the sound of the virtual reality experience more realistic.

SUMMARY

This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, the invention includes a computer system communicatively coupled with a communications network. The computer system comprises a headset configured to be placed on a user's head. The headband has a first end opposing a second end and configured to sit on top of a user's head, an ear cup attached to each end of the headband, wherein each ear cup includes a driver to receive an audio signal having a plurality of channels, and a transmitting device for outputting a plurality of sound waves based on the audio signal received.

The headset also comprises a microphone communicatively coupled with the headband, wherein the microphone is configured for a) receiving a plurality of sound waves, b) converting the plurality of sound waves into an audio signal, and c) transmitting the audio signal to a microphone processing module in the headset.

The computer system also includes a sound processing module configured for a) receiving a plurality of sound data corresponding with a sound profile, via the communications network, associated with a virtual reality environment, b) processing said plurality of sound data, c) converting said plurality of sound data into a set of audio signals each having a plurality of channels, and, d) transmitting each audio signal to each driver of each ear cup.

In one embodiment the sound data includes data for representing a first distance, a first positioning, and a second object emitting orientation. The first distance is a perceived dimension between a first avatar position of said user and a second avatar position of a second sound emitting object. The first positioning is where the first avatar position is orientated relative to the second avatar position. The second emitting orientation is a direction sound emanates from the second sound emitting object.

The headset may also include a microphone processing module for a) receiving a microphone audio signal from the microphone, b) processing the microphone audio signal and converting the microphone audio signal into a voice data packet, c) transmitting said voice data packet, via the communications network, for presenting on an emitting device at each terminal of a plurality of terminals.

The headset also includes a headset haptic device adapted for a) receiving a plurality of audio signals corresponding with said sound profile associated with the virtual reality environment, each audio signal having a plurality of channels, b) converting the plurality of audio signals into a haptic profile corresponding to the sound profile, and, c) transmitting vibrations corresponding with the haptic profile from the headset haptic device through the headband to the crown of the user's skull and from each ear cup to the skull around each user's ears.

The headset also includes a boom having a first end and a second end. The first end of the boom is configured to attach proximate to one of the ear cups and wherein the microphone is configured to attach at the second end of a boom.

The headset may also include a remote handheld device in communication with the headset comprising a pad having a user interface. The remote handheld device includes an input mode and a tactile mode. In the tactile mode the handheld device is configured for providing tactile sensations associated with the virtual reality environment. In the input mode the handheld device is configured for a user to input a plurality of commands via the user interface for controlling characteristics of the sound waves and vibrations output by headphones.

BRIEF DESCRIPTION OF THE DRAWINGS

The subject matter, which is regarded as the disclosed embodiments, is particularly pointed out and distinctly claimed in the claims at the conclusion of the specification. The foregoing and other features and also the advantages of the disclosed embodiments will be apparent from the following detailed description taken in conjunction with the accompanying drawings. Additionally, the left most digit of a reference number identifies the drawing in which the reference number first appears. The accompanying drawings, which are incorporated in and constitute a part of this disclosure, illustrate various example embodiments. In the drawings:

DETAILED DESCRIPTION

Figure 1:
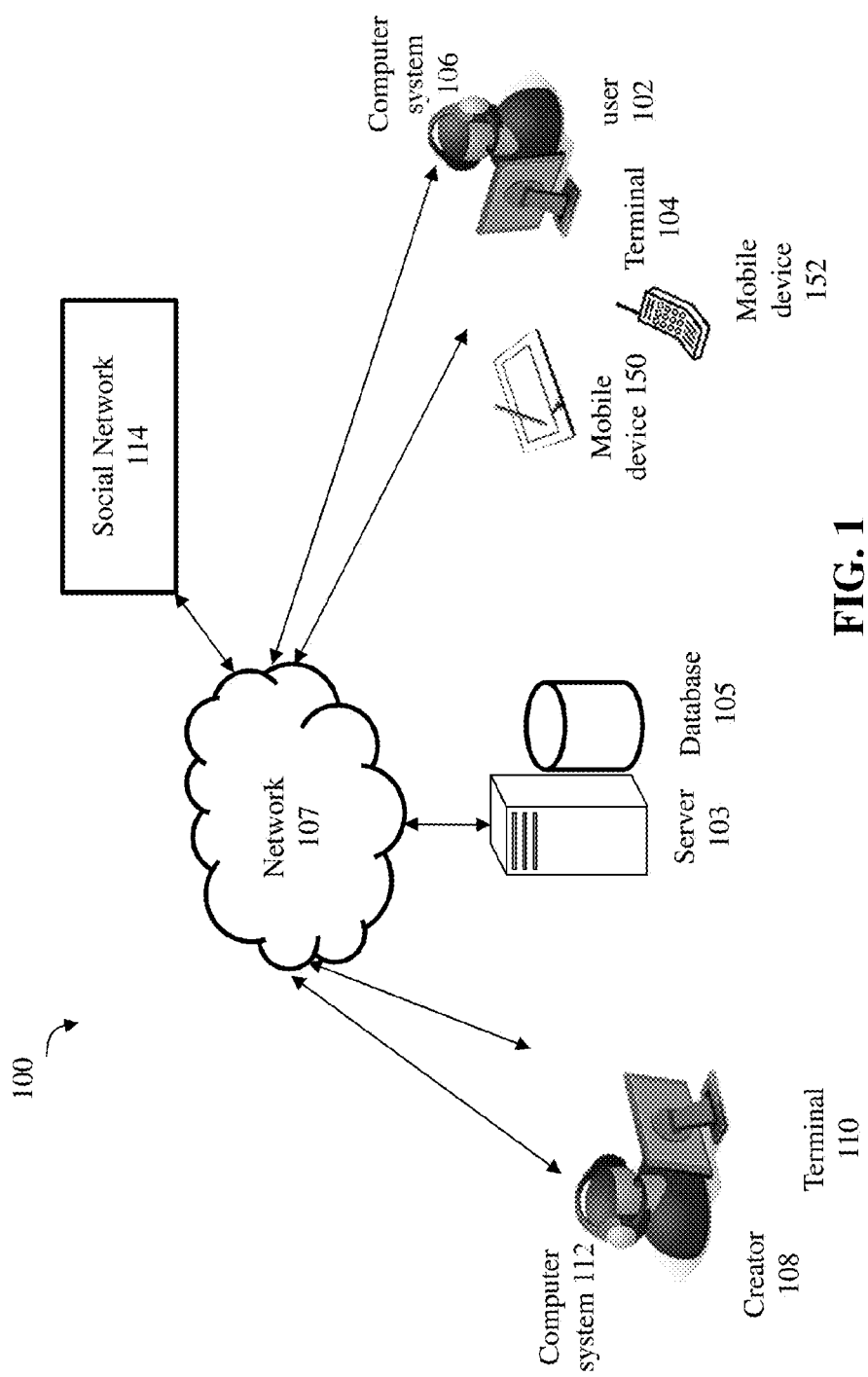
FIG. 1 is a diagram of an operating environment that supports the computer system for a social virtual reality environment, according to an example embodiment.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosed embodiments. Instead, the proper scope of the disclosed embodiments is defined by the appended claims.

The disclosed embodiments improve over the prior art by providing a more realistic virtual reality experience. This includes providing sounds more accurately depicting depth, range, perspective and distance of the actual sound as if it existed in the natural originating environment. The disclosed embodiments also provide headsets that are dynamic and responsive to a user's movements. This disclosed embodiments also allows users to move naturally in their virtual reality environment. The disclosed embodiments also provide haptic feedback and sensations based on sound intensity and range so that you a user can hear and feel a sound. The disclosed embodiments utilize a virtual reality environment geometry and characteristics and take such geometries and characteristics into account in order to dynamically generate real-time audio and the ability to precisely perceived differences in sound direction.

FIG. 1 is a diagram of an operating environment 100 that supports the computer system for interacting within a virtual reality environment, according to one embodiment. In one embodiment, the invention is a computer system communicatively coupled with a communications network 107 for interacting within a virtual reality environment.

The virtual reality environment can emulate a variety of different settings. For example, the virtual reality environment may be lounges, meeting places, stores, movie theaters, sporting events, bars, restaurants, shops, etc. In another embodiment, the environment may include broadcasts of live events, such as sporting events, concerts, or other destinations.

The system includes a creator or user 108 utilizing a terminal 110 and computer system 112 for generating environment data associated with the virtual reality environment for presenting on a displaying device at each of a plurality of terminals 104 of users, wherein the environment data also includes audio content, visual content and metadata. The creator 108 may be a software developer, developer, computer programmer or any other person that is able to program and/or develop virtual reality environments. In FIG. 1, only one creator is shown, however this is not meant to be a limitation and multiple creators may transmit, via the communication network, environments to each of the plurality of users. Additionally, in FIG. 1, only one user 102 utilizing one terminal 104 and computer system 106 is shown, however this is not meant to be a limitation and multiple user may use the system, via the communication network. The system may be in communication with a social network 114, which may be an online social networking service, such as Facebook and Twitter, which provides well known social networking services, such as message delivery, profile creation and browsing, etc.

The system also includes transmitting, over the communications network, the virtual environment data for presenting on the displaying device at each terminal of the plurality of terminals. The system also includes transmitting, over the communications network 107, audio content, visual content and metadata for presenting on the displaying device at each terminal of the plurality of terminals.

Each consumer may navigate a corresponding avatar through the multi-dimensional virtual reality environment using the virtual reality device. In one embodiment, the virtual reality device may be a consumer virtual reality device such as goggles, a heads up display or other input-output device. In another embodiment, the display device may include the OCULUS RIFT, Samsung Gear VR and other head mounted devices. The virtual reality devices may also include various sensors, detectors and output devices that allow the consumer a more lifelike experience when interacting with other consumer's avatars in the virtual reality environment.

In one embodiment, the displaying device may include a monitor for the user to view the virtual environment and a console for such user to influence or navigate avatars in the environment. Each user may navigate a corresponding avatar through the virtual reality environment using the computer system. User 102 may use an avatar known as a first avatar. The system may be configured to identify a first avatar position of a first user when user 102 is navigating the system. The first avatar position may be defined as the location of the first user's avatar within the virtual reality environment and such location may be defined by a set of data, algorithms, program logic comprising computer source code, scripting language code or interpreted language code that perform various functions of the present invention, or any other means known to those skilled in the art. The system may also be configured to identify or define a second avatar position of a second sound emitting object. The second sound emitting object may be a second user using the system. The second avatar position may be defined as the location of a second user's avatar within the virtual reality environment and such location may be defined by a set of data, algorithms, code or any other means known to those skilled in the art.

The system is also configured to calculate data representing a first distance, wherein the first distance corresponds to a perceived dimension between the first avatar position and the second avatar position; calculate data representing a first positioning, wherein the first positioning corresponds to where the first avatar position is orientated relative to the second avatar position; and calculating data representing a second emitting orientation, wherein the second emitting orientation corresponds to a direction sound emanates from the second sound emitting object.

By way of example, if a second avatar position is spatially orientated directly above a first avatar position within the virtual reality environment, then the data representing the first positioning will include sound data that corresponds or sounds similar to the sound perceived by an individual in a natural originating environment when a sound emitting source is located directly above the individual in a natural originating environment. By way of another example, if a second avatar position is 10 feet from a first avatar within the virtual reality environment, then the data representing the first distance will correspond to the sound perceived by an individual in a natural originating environment when a sound emitting source is approximately 10 feet away from such individual in a natural originating environment. By way of another example, if a second avatar is facing away from a first avatar in the virtual reality environment, then the system will calculate data such that the second object emitting orientation corresponds to the sound perceived by an individual when they sound emitting source is facing away from an individual in a natural originating environment. Additionally, the system is able to calculate real-time changes in the first distance, changes in the first position and second object emitting orientation. As a result, the system is able to provide more realistic sound to a user. Additionally the system provides sound that more accurately reflects the depth, range, perspective and distance of sound as if it existed in the natural originating environment.

Terminals 104, 110, mobile devices, 150, 152 and computer system 106 and 112 may each include program logic comprising computer source code, scripting language code or interpreted language code that perform various functions of the present invention. It should be noted that although FIG. 1 shows only two terminals 104, 110, two mobile devices, 150, 152, two computer systems 106, 112, and one server 103, the system of the present invention supports any number of terminals or computing devices connected via network 107. Also note that although server 103 is shown as a single and independent entity, in one embodiment, server 103 and its functionality can be realized in a centralized fashion in one computer system or in a distributed fashion wherein different elements are spread across several interconnected computer systems.

A prominent element of FIG. 1 is the server 103 associated with repository or database 105 and further coupled with network 107, which can be a circuit switched network, such as the Public Service Telephone Network (PSTN), or a packet switched network, such as the Internet or the World Wide Web, the global telephone network, a cellular network, a mobile communications network, or any combination of the above.

Figure 2A:
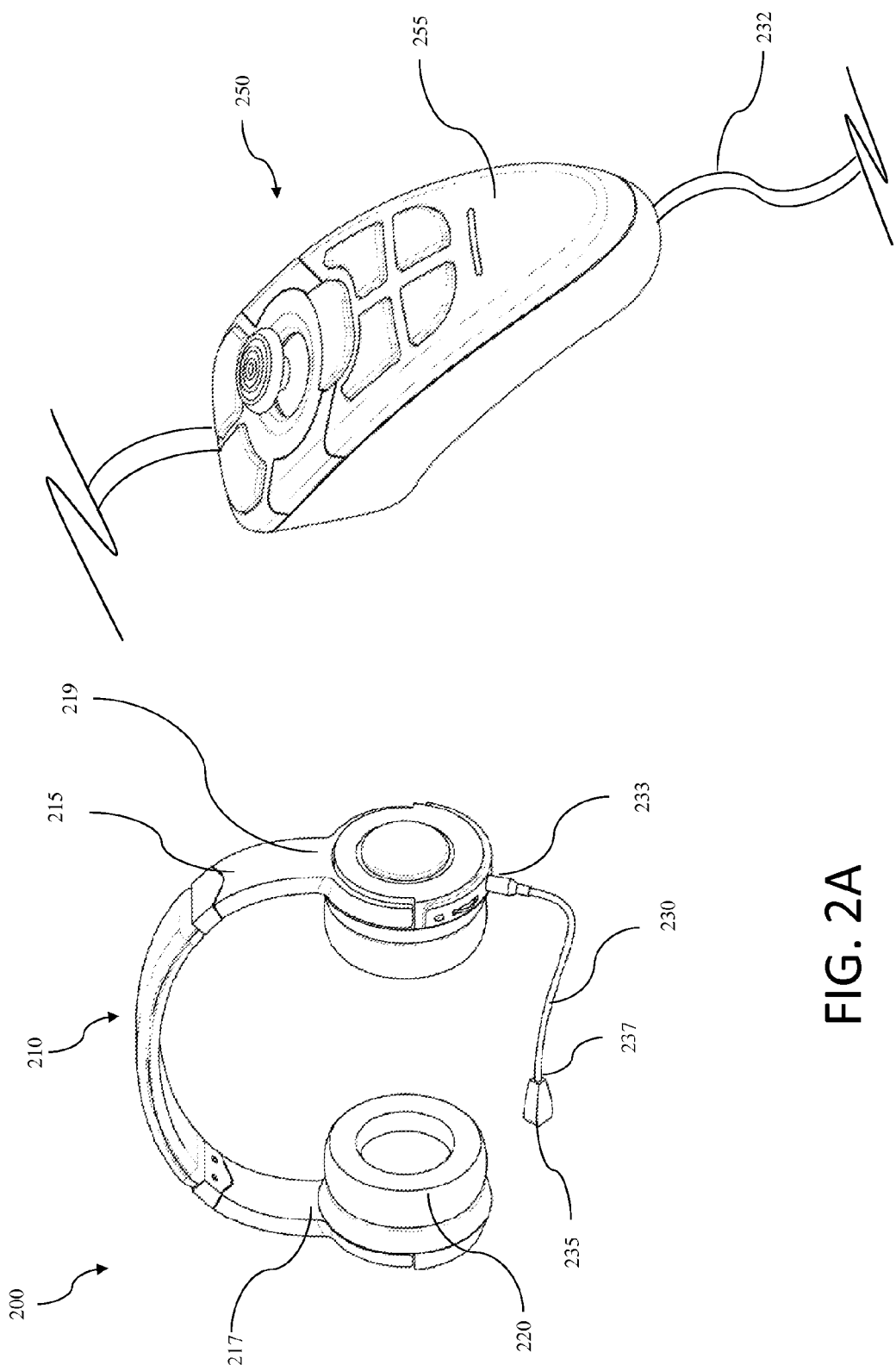
FIG. 2A is a perspective view of an illustration of a headset, microphone and remote handheld device, according to an example embodiment.
Figure 2B:
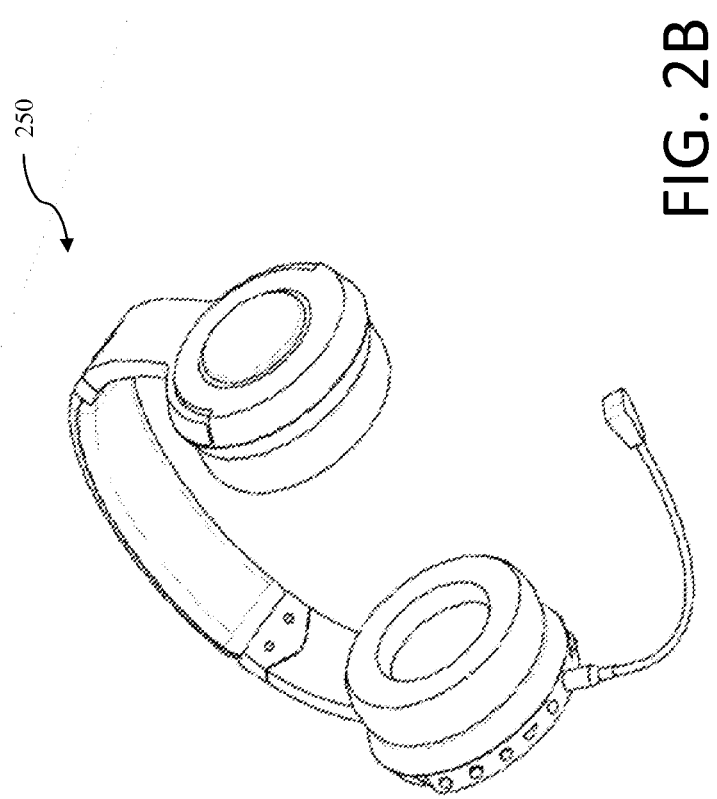
FIG. 2B is another perspective view of an illustration of a headset, according to an example embodiment.

FIGS. 2A and 2B are perspective views of a headset, according to a sample embodiment. FIGS. 2A and 2B will be discussed together. The computer system comprises a headset 210 adapted to be placed on a user's head. The head set is commutatively coupled to the system. In one embodiment the system is coupled wirelessly or using Bluetooth technology. The headset comprises a headband 215 having a first end 217 opposing a second end 219 and adapted to sit on top of the head (not shown).

An ear cup or piece 220 is attached to each end of the headband, wherein each ear cup includes a driver (not shown) configured to receive an audio signal having a plurality of channels, and a transmitting device (not shown) for outputting a plurality like material, phone, and well known to those skilled in the art. Each ear cup may be adapted to surround the ears and is well known to those skilled in the art. Additionally, the headband may comprise material such as plastic, polymers, and such material are well known to those skilled in the art. In other embodiments, the ear cup may be an earpiece adapted to fit within a portion of the ear. Such ear pieces are well known to those skilled in the art.

A microphone 235 can be commutatively coupled with the headband. In another embodiment the microphone is not coupled to the headset. The microphone is adapted for receiving a plurality of sound waves. The microphone converts the sound waves into an audio signal. The audio signal is then transmitted and received by a microphone processing module. The microphone processing module then processes the microphone audio signal and converts the microphone audio signal into a voice data packet. The voice data packet includes a plurality of data corresponding to the characteristics of the sound wave received by the microphone. The voice packet may also include sound data (first distance, first positioning, and emitting orientation) of the object within the virtual reality environment. The microphone processing module can then transmit the voice data packet, via the communications network 107, for presenting on an emitting device or computer system remote from the microphone's location. Such a displaying device can include speakers, headsets, computers, or another other device or emitting sound.

A boom 230 having a first end 233 opposing a second end 237 communicatively couples the microphone to the headset. The first end of the boom is attached proximate to one of the ear cups. The microphone is attached at the second end of a boom. It is understood that the term earpiece an ear cup may be used interchangeably.

The computer system also includes a sound processing module for receiving a plurality of sound data, via the communications network 107, associated with a virtual reality environment. The sound data corresponds to sound waves. In one embodiment, the sound data can correspond to the characteristics of sound and position data of an object or avatar within the virtual reality environment, including sound pitch, quality, loudness, position of object, depth, range, perspective and distance of the actual sound as if it existed in the natural originating environment or within a virtual reality environment.

In one embodiment, the sound data includes data for representing a first distance, a first positioning, and a second object emitting orientation. The first distance is a perceived dimension between a first avatar position of said user and a second avatar position of a second sound emitting object or source. For example, a first avatar position within the virtual reality environment can correspond to a first user. A second avatar position within the virtual reality environment corresponds to a second user. The first positioning is the location where the first avatar position is orientated relative to the second avatar position within the virtual environment. The second emitting orientation is a direction sound emanates from the second sound emitting object or source. For example, if a second sound source is faced away from a receiver then the sound waves generated by the sound source are perceived a certain way by the receiver due to the orientation of the sound source. Similarly, in one embodiment of the present invention, sound data will include orientation data such that emulates lifelike perception of sound based upon the second object emitting orientation relative to the first avatar position of a user within the virtual reality environment.

The sound processing module is configured for calculating data representing a first distance, first positioning, and second emitting orientation. The sound processing module uses digital signal processors, computer software and other processes and devices to process the sound data. The sound processing module then converts said plurality of data into a set or plurality of audio signals each having a plurality of channels. Each of these audio signals are then transmitted to each driver (not shown) of each ear cup 220.

The computer system also includes a headset haptic device (not shown). The haptic device is positioned along the headband 215 and each of the ear cups 220 and is adapted so that vibrations, forces and motions can be delivered to users when the computer system is worn by a user. The haptic device may include a shaker that is adapted for such producing vibrations, forces, or motions that are adapted to be received by a user. In one embodiment, the shaker may include a haptic motor or other similar device known to those skilled in the art. The haptic device is adapted for receiving a plurality of audio signals corresponding with the sound profile associated with the virtual reality environment. Each audio signal corresponds to sound waves received at a remote location and then processed into an audio signal or can correspond to the sound data converted by the sound processor of the computer system.

The audio signals include data corresponding to the sound quality, loudness and pitch and position of a sound emitting source or object within the virtual reality environment. The sound profile may also include sound data corresponding to the virtual reality environment. For example, the sound data of the sound profile may also include environment data that corresponds to a geometric shape, dimension and material defining the virtual reality environment. For example, the sound data corresponding to sound being emitted from a sound source within a virtual reality environment, such as an open air football stadium will be comprised differently than the sound data corresponding to sound the from a small room. Another example is that sound data corresponding to sound emanating from a source within a virtual reality environment including water, such as an indoor pool, will be comprised quite differently than the sound data corresponding to sound being emitted from a source within a large open field.

The haptic headset device may include a processor that converts the plurality of audio signals into a haptic profile corresponding to the sound data. The haptic profile includes the vibrations, forces and motions associated or that correspond to sound data. The haptic headset device also transmits vibrations corresponding with the haptic profile from the headset haptic device through the headband 215 to the crown of the user's skull and from each ear cup or earpiece 220 to the skull around each user's ears. The vibrations and the sound emanating from the headset may have a plurality of phases and intensities corresponding to the sound profile of the virtual reality environment.

In one embodiment, the computer system also includes a remote handheld device or remote controller 250 in communication with the headset 210. In one embodiment, the remote controller may be in wireless communication with the headset. In one embodiment, the remote handheld device can have a rectangular shaped pad 255 and is in communication, either wirelessly or via a cable 232, to the terminal 104, 108 or mobile devices 150, 152. The pad 255 having a user interface, wherein the remote handheld device can be switched between an input mode and a tactile mode. In one embodiment the modes may be used simultaneously. The user interface can be an electronic visual display that can be controlled by touching the screen. In the alternative or in combination with the electronic visual display, the user interface may include a plurality of physical controlling devices, such as buttons, keys, toggles etc. for entering data.

In the input mode, a user can input a plurality of data or commands via the user interface and can control a plurality of outputs of the headphones and output of the handheld device or remote. The input may include user information, data for controlling the computer system (sound volume, vibrational intensity etc.) and user settings. In the input mode, the user interface can be used to control characteristics of the sound waves and vibrations output by the headphones via the user interface. Additionally, the user interface of the handheld device can be used to control or command the characteristics of the vibrations output but headphones. For example, the handheld device may be able to increase or decrease the volume, intensity, frequency, of the sound. Similarly, the intensity and frequency and other characteristics of the vibrations produced by the haptic device of the headphones and hand-held controller may be adjusted using the user interface of the hand-held controller 400, 250. Additionally, in the input mode a user or creator can navigate and communicate within the virtual reality environment.

In the tactile mode, a user can receive a plurality of tactile feedback associated with the virtual reality environment. The virtual reality environment may also include data corresponding to the physical attributes, including texture, of an object within the virtual reality environment. In the tactile mode, data from the virtual reality environment is received and converted into corresponding physical attributes for display on the pad. Once displayed on the pad, a user can use the sense of touch to feel what the object displayed within the virtual reality environment feels like. In other embodiments, the handheld device is adapted for providing the user with a plurality of tactile sensations.

Figure 3:
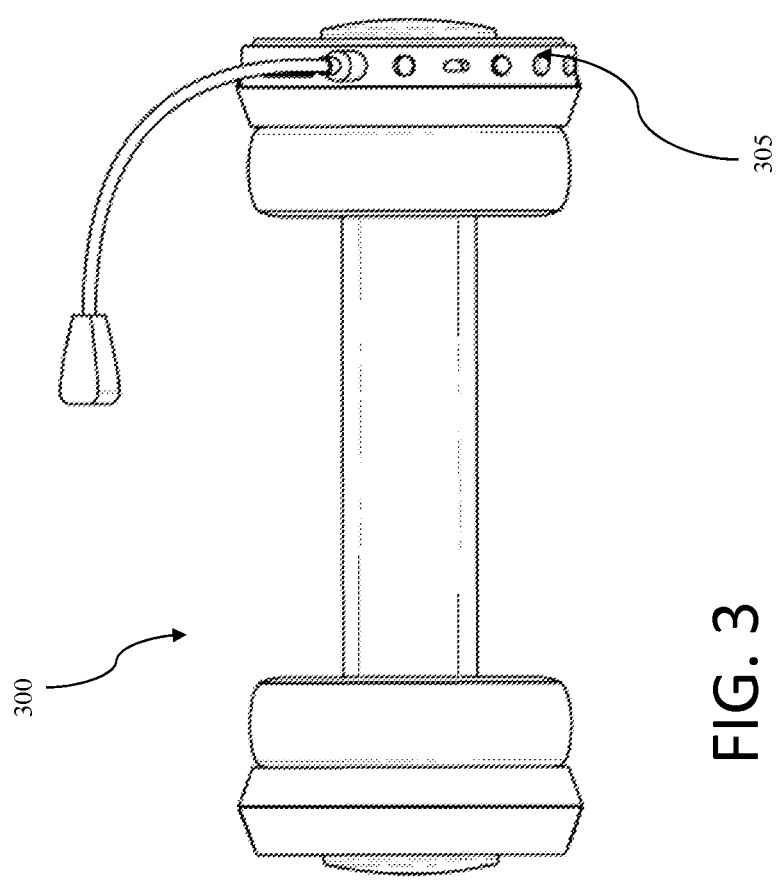
FIG. 3 is a perspective view of an illustration of a headset, according to another example embodiment.

FIG. 3 is a perspective view of an illustration of a headset, according to another example embodiment. In the present embodiment, the headset 300 also includes a user interface 305. In one embodiment, the user interface is configured for controlling the characteristics of sound waves and vibrations output by the headphones. For example, in one embodiment, a user can provide commands in order to adjust the volume of the sound waves, increase or decrease the haptic feedback of the device, turn the device on and off, etc. by using the interface (button, toggles, dials, knobs, display etc.) on the headset. In one embodiment, the commands may be executed by pushing a dial or pressing or moving a button or knob. Additionally, coordinated be attached to the headset to communicatively couple the headset two the computer system and/or the remote handheld device.

Figure 4:
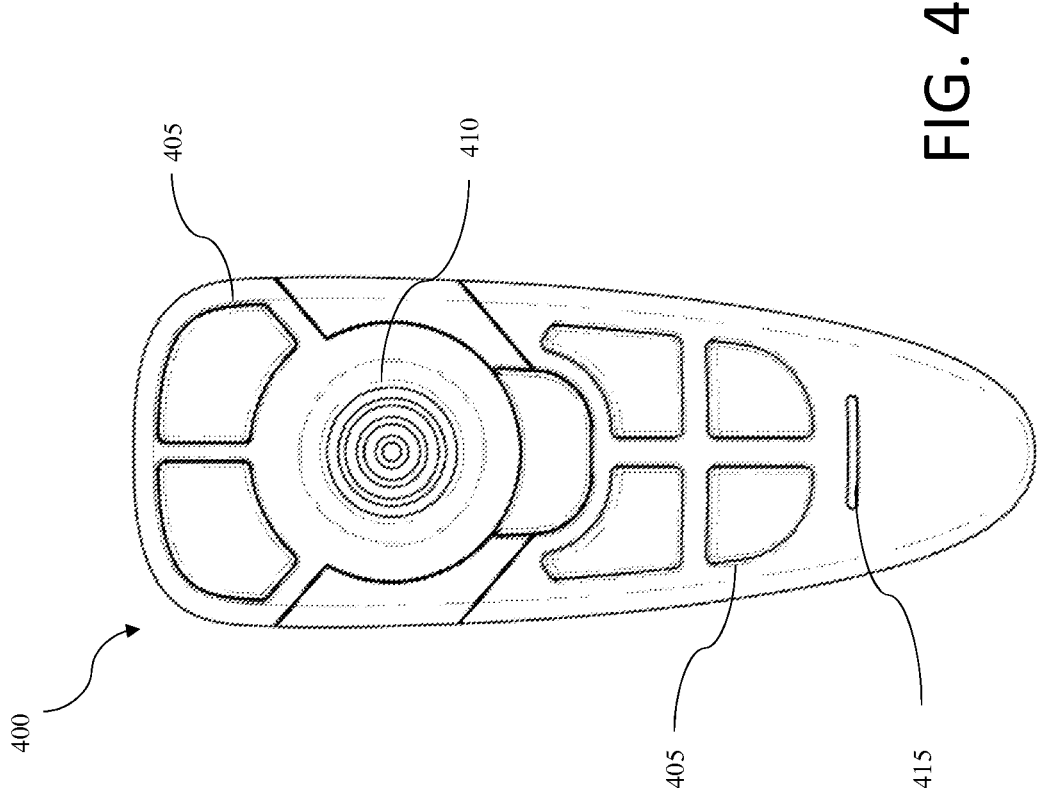
FIG. 4 is a perspective view of an illustration of a remote handheld device, according to another example embodiment.

FIG. 4 is a perspective view of an illustration of a remote handheld device, according to another sample embodiment. The remote handheld device 400 comprises a user interface having a plurality of buttons 405 and a joystick 410. In one embodiment, joystick for 410 can be used to navigate an avatar within the virtual reality environment. As mentioned above, the remote handheld device may be in wireless communication with the headset or computer system. In one embodiment, the system may include functional indicators 415, such as lights, LED lights, etc. to indicate varying functionalities of the device. Both the handheld device 400, 250 and the headset 210, 250, 300 may be configured to be powered by external power source (not shown) or may include a battery pack of at least one battery in order to power such devices.

Each terminal 104, 110, mobile device, 150, 152, 154, 156 and computer system 106, 112, may comprise any computing devices, such as integrated circuits, printed circuit boards, processors, ASICs, PCBs, cellular telephones, smart phones, tablet computers, desktop computers, laptops, and game consoles, for example. Terminals 104, 110, mobile devices, 150, 152, and computer system 106, 112 may be connected either wirelessly or in a wired or fiber optic form, using cables, to the communications network 107. The communications network may be one or more packet switched networks, such as the Internet, or any local area networks, wide area networks, enterprise private networks, cellular networks, phone networks, mobile communications networks, or any combination of the above. In one embodiment, the terminals 104, 110 and mobile devices, 150, 152, are a programmable logic controller or PLC.

Server 103 includes a software engine that delivers applications, data, program code and other information to terminals 110, 104, mobile devices 150, 152, 154, 156 and computer systems 106, 112. The software engine of server 103 may perform other processes such as transferring multimedia data in a stream of packets that are interpreted and rendered by a software application as the packets arrive. FIG. 1 further shows that server 103 includes a database or repository 105, which may be a relational database comprising a Structured Query Language (SQL) database stored in a SQL server or a database that adheres to the noSQL paradigm. Terminals 104,110, and computer systems 106, 112, mobile devices 150, 152, 154, 156 may also each include databases. The database 103 may serve data from computer systems 106, 112, as well as related information, used by server 103 and terminals 104, 110, mobile devices 150, 152, 154, 156 during the course of operation of the invention.

Terminals 104, 110, mobile devices 150, 152, 154, 156, computer systems 106, 112 and server 103 may each include program logic comprising computer source code, scripting language code or interpreted language code that perform various functions of the present invention. It should be noted that although FIG. 1 shows only two terminals 104, 110, two mobile devices 150, 152, two computer systems 106, 112 and one server 102, the system of the present invention supports any number of terminals or computing devices connected via network 107. Also note that although server 103 is shown as a single and independent entity, in one embodiment, server 103 and its functionality can be realized in a centralized fashion in one computer system or in a distributed fashion wherein different elements are spread across several interconnected computer systems.

Figure 5:
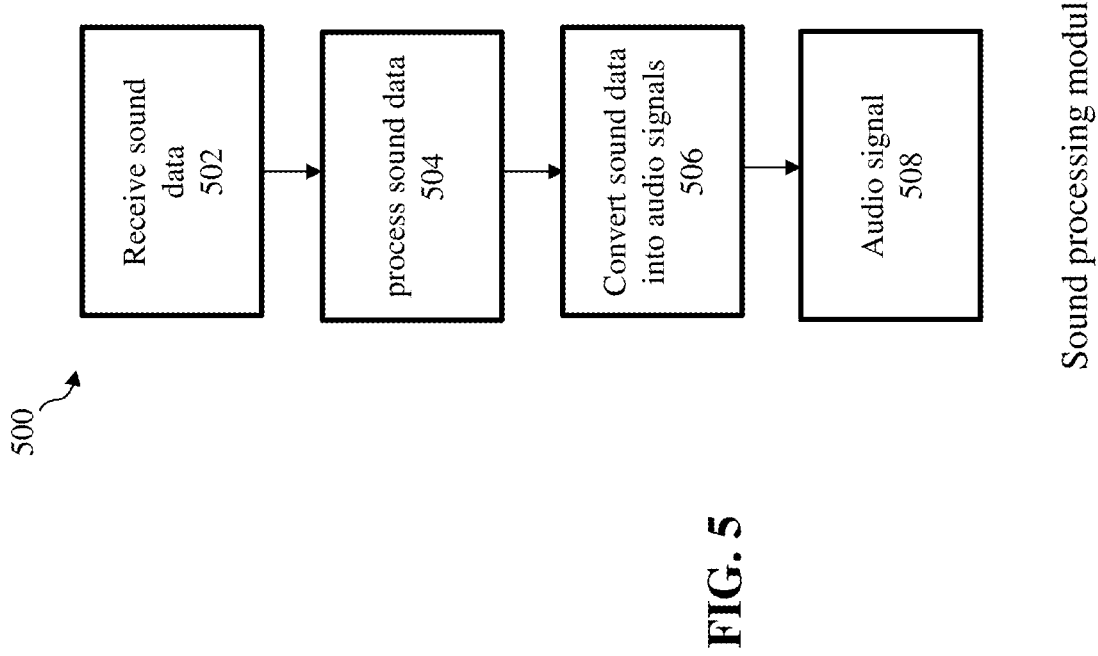
FIG. 5 is a flow chart illustrating the control flow of a process or method of a sound processing module, according to an example embodiment.

FIG. 5 is a flow chart illustrating the control flow of the process or method 500 of a sound processing module, according to an example embodiment. In one embodiment, server 103 includes a sound processing module. In another embodiment the sound processing module is included in the headset. The sound processing module configured is for a) receiving a plurality of sound data corresponding with a sound profile, via the communications network, associated with a virtual reality environment, b) processing said plurality of sound data, c) converting said plurality of sound data into a set of audio signals each having a plurality of channels, and d) transmitting each audio signal to each driver of each ear cup. As mentioned above the sound data includes data for representing a first distance, a first positioning, and a second object emitting orientation. The first distance is a perceived dimension between a first avatar position of said user and a second avatar position of a second sound emitting object. The first positioning is the location where the first avatar position is orientated relative to the second avatar position. The second emitting orientation is a direction sound emanates from the second sound emitting object.

In operation, step 502, the sound processing module receives a plurality of sound data corresponding with a sound profile, via the communications network, associated with a virtual reality environment. As mentioned above, the sound data may include data corresponding to users of the system as well as environment data of the virtual reality environments, such as the geographic shape of the environment, dimensions and material that define the virtual reality environment. Next in step 504, the sound processing module processes the sound data. In step 506, the sound processing module converts the plurality of sound data into a set of audio signals each having a plurality of channels. In step 506 the sound processing module transmits each audio signal to each driver of each ear cup or piece.

Figure 5A:
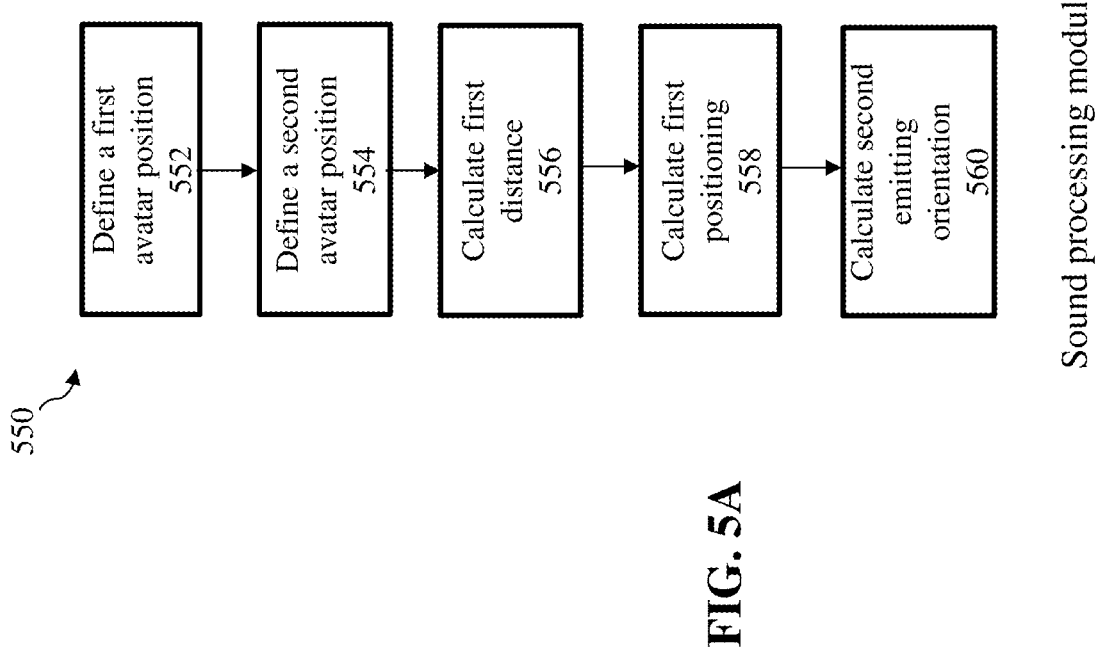
FIG. 5A is a flow chart illustrating an additional control flow of a process or method of a sound processing module, according to an example embodiment.

FIG. 5A is a flow chart illustrating an additional control flow 550 of a process or method of a sound processing module, according to an example embodiment. FIG. 5A illustrates another process performed by the sound processing module. The functions performed in FIG. 5A may also be carried out by additional modules located within the computer system. As mentioned above, the sound processing module is also configured for defining a first avatar position, wherein the first avatar position corresponds to said user within the virtual reality environment; defining a second avatar position, wherein the second avatar position corresponds to said second user within the virtual reality environment; calculating data representing a first distance, wherein the first distance corresponds to a perceived dimension between the first avatar position and second avatar position; calculating data representing a first positioning, wherein the first positioning corresponds to where the first avatar position is orientated relative to the second avatar position; and calculating data representing a second emitting orientation, wherein the second emitting orientation corresponds is a direction sound emanates from the second sound emitting object. In step 552, the sound processing module defines the first avatar position. The first avatar may be navigated by and correspond to a first user using the computer system. The first avatar position is a position within the virtual reality environment and may include a program logic code, and may be defined by a set of data, algorithms, program logic comprising computer source code, scripting language code or interpreted language code that perform various functions of the present invention, or any other means known to those skilled in the art.

In operation, the first user has a first avatar located within a virtual reality environment. The first user may be navigated within the environment in order to interact with avatars of other users. The sound processing module facilitates a more lifelike experience for the user. The sound processing module allows a first user to receive a sound waves based upon the position of the first avatar of the first user relative to other sound emitting objects within the virtual reality environments.

In step 554, the sound processing module defines the second avatar position. The second avatar may include the perceived position of a second avatar within the virtual reality environment. The second avatar position is a position within the virtual reality environment and may include a program logic code, and may be defined by a set of data, algorithms, program logic comprising computer source code, scripting language code or interpreted language code that perform various functions of the present invention, or any other means known to those skilled in the art. Next, in step 556, the sound processing module will calculate the first distance. The first distance corresponds to a perceived dimension between the first avatar position and second avatar position. Next, in step 558, the sound processing module will calculate data representing a first positioning. The first positioning corresponds to a location of where the first avatar position is orientated relative to the second avatar position. In other words, the first positioning provides sound data that allows a user to distinguish whether a sound emitting source is located above, below, to the right, to the left etc. of a first avatar position of the first user. Next, in step 560, the sound processing module will calculate data representing a second emitting orientation. The second emitting orientation corresponds to a direction sound emanates from the second sound emitting object. In other words, the second emitting orientation provides sound data that allows a user to distinguish whether a sound emitting source is facing towards or away the first avatar.

Figure 6:
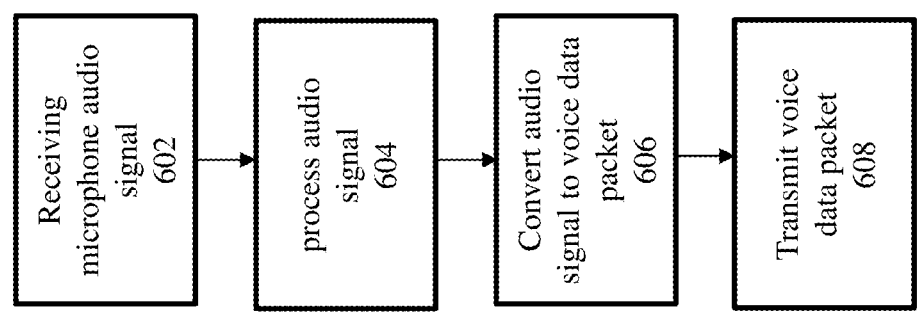
FIG. 6 is a flow chart illustrating the control flow of a process or method of a microphone processing module, according to an example embodiment.

FIG. 6 is a flow chart illustrating the control flow of a process 600 or method of a microphone processing module, according to an example embodiment. The microphone is adapted to convert the plurality of sound waves into an audio signal. The microphone may be a dynamic microphone, a condenser microphone, a unidirectional microphone, a bidirectional microphone, an omnidirectional microphone, wireless microphone, lapel microphone etc. The microphone then transmit the audio signal to the microphone module in in the headset.

As mentioned above, a microphone processing module is configured for a) receiving a microphone audio signal from the microphone, b) processing the microphone audio signal and converting the microphone audio signal into a voice data packet, and, c) transmitting said voice data packet, via the communications network, and, for presenting on a emitting device at each terminal of a plurality of terminals. In operation, in step 602, the microphone processing module receives a microphone audio signal from the microphone. The audio signal comprises data received from a plurality of sound waves received from the microphone. Next, in step 604, the sound processing module processes the sound data. The sound data may include first distance data, first positioning data, second and emitting orientation data, as well as environment data (such as virtual reality geometric shape, material, and dimensions). The sound data may also include a plurality of phases and intensities corresponding to the sound profile of the virtual reality environment and users of the system. Next, in step 606, the sound processing module converts the audio signal into a voice data packet. Next, in step 608, the sound processing module transmits the voice data packet, via the communications network, for presenting on an emitting device at each a plurality of systems. In other words, the microphone processing module is able to transmit a first user's voice or sound waves received by first user's microphone to a second user of the system while providing a more accurate depiction of the depth, range, perspective and distance in relationship between multiple users within the virtual reality environment.

Figure 7:
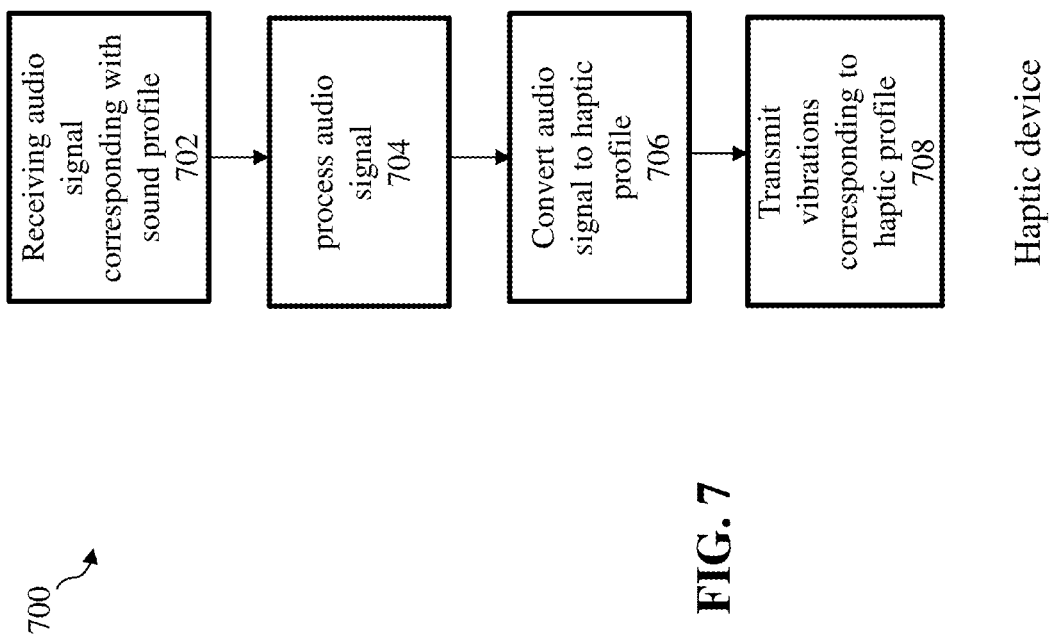
FIG. 7 is a flow chart illustrating the control flow of a process or method of a haptic processing module, according to an example embodiment.

FIG. 7 is a flow chart illustrating the control flow of a process or method 700 of a haptic processing module, according to an example embodiment. The haptic processing module may be included within the headset or within the server 103. The haptic device comprises a processor configured or adapted for a) receiving a plurality of audio signals corresponding with said sound profile associated with the virtual reality environment, each audio signal having a plurality of channels, b) converting the plurality of audio signals into a haptic profile corresponding to the sound profile, and, c) transmitting vibrations corresponding with the haptic profile from the headset haptic device through the headband to the crown of the user's skull and from each ear cup to the skull around each user's ears.

In operation, the haptic device may provide tactile sensations, vibrations and feedback to the user to provide a more realistic experience. In one embodiment, the haptic device may also include a shaker, such as a haptic motor. In one embodiment, the system uses a vibrating component (sometimes called actuator) such as a vibration motor or a linear resonant actuator which is driven by an electronic circuit. In one embodiment, the remote handheld device is in communication with the headset and may provide commands to the system for controlling the haptic feedback via by the haptic processing module. In operation, in step 702, an audio signal corresponding with the sound profile associated with the virtual reality environments and users of the environment is received by the haptic device. Next, in step 704, the haptic device converts the plurality of audio signals into a haptic profile that corresponds to the sound profile. For example, if a sound emitting object or source provides sounds comprising a high-frequency, then the sound data will comprise data reflecting such high-frequency and then the haptic profile corresponding to such sound will have data that will comprise haptic feedback comprising vibrational or motion waves having a high-frequency. In step 708, the processor of the haptic device will transmit vibrations, motion, and haptic feedback correspond with the haptic profile to be displayed on or provided by haptic device, in the form of vibrations or motions via the shaker. As mentioned above, the haptic device will provide vibrations or movements through the headband to the crown of a user's skull and proximate to each of the ear cups of the device. A similar processor may also be used for the haptic device located within the remote handheld controller.

Figure 8:
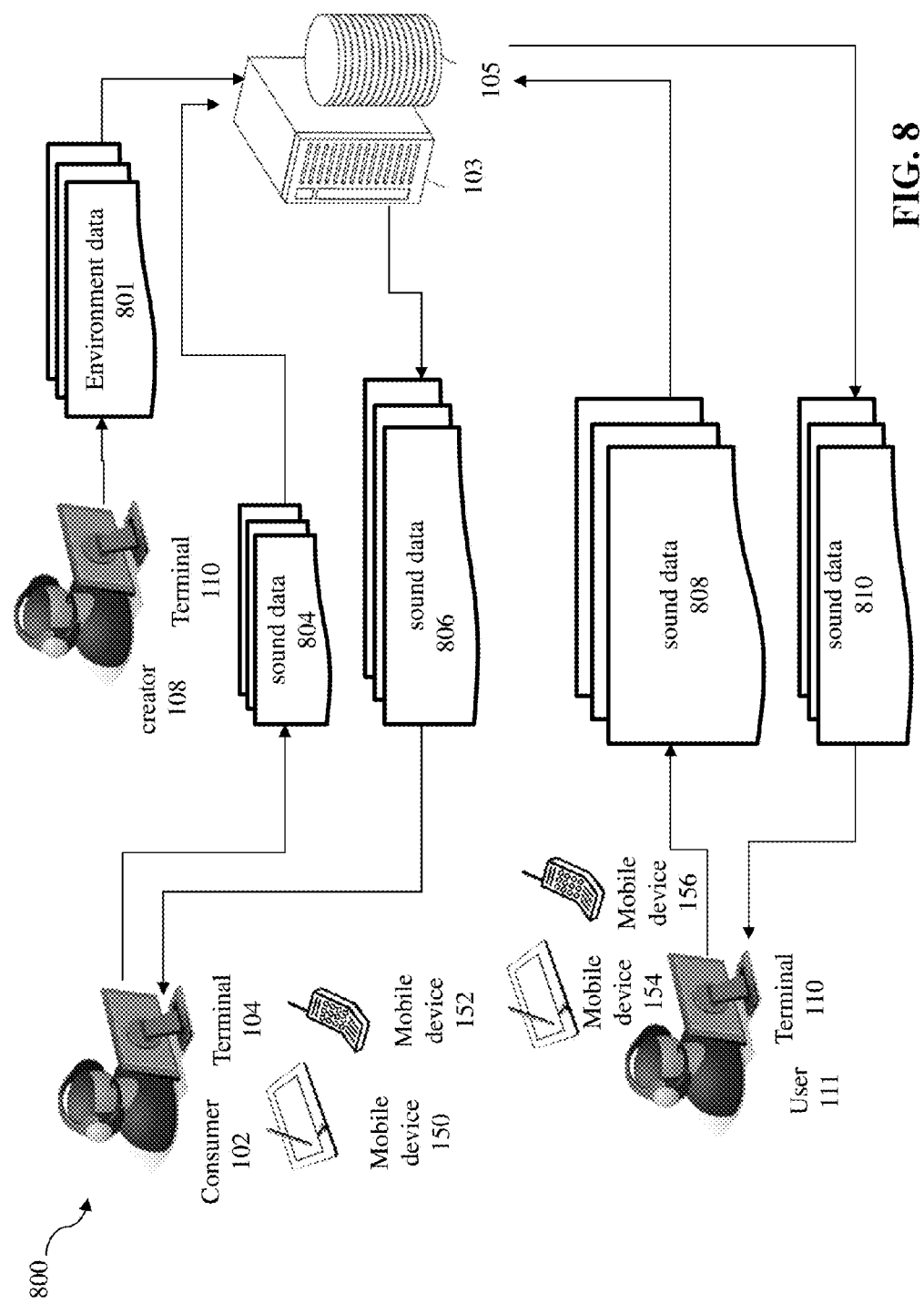
FIG. 8 is a diagram illustrating the data flow of the process or method utilized for experiencing multi-dimensional content in a virtual reality environment over a communications network, according to an example embodiment; and, FIG. 9 is a block diagram of a system including an example computing device and other computing devices.

FIG. 8 is a diagram illustrating the data flow 800 of the process or method utilized for experiencing multi-dimensional content in a virtual reality environment over a communications network, according to an example embodiment. FIG. 8 illustrates at least two users or consumers using the computer system. Users or consumers 102, 111 are located in remote locations. Both users, 102, 111 are using the headset according to one of the present non limiting embodiments. In step 801, the creator 108 may provide environment data for the virtual reality environment in which each user may navigate an avatar. When in the environment, each user may interact with the avatar of other users. As mentioned above, a plurality of virtual reality environments include sports arenas, concert halls, large open spaces, small office buildings. Each virtual reality environment may comprise different geometric shapes, material, and dimensions. Each of the environments may comprise data, including sound data providing a sound profile corresponding to a variety of virtual reality environments. Additionally, the environment data may also include how a virtual reality environment corresponds or interacts with data from each of a plurality of users/avatars.

In operation, the first user or consumer 102 may navigate a first avatar within a certain virtual reality environment. It is understood that the computer system comprising the headset may also operate in conjunction with mobile devices such as telephones, smart phones, tables, PDA etc. such as mobile devices 150, 152, 154, 156. The computer system of the present invention will provide user sound data, as illustrated in step 804. As mentioned above, the sound data may include, a first avatar position within the virtual reality environment, sound pitch, quality, loudness, position of object, depth, range, perspective and distance of the actual sound as if it existed in the natural originating environment or within a virtual reality environment. As mentioned above, the first user may use the remote handheld controller or handheld device 250, 400 to navigate within the virtual reality environment. The handheld device may include an input mode and a tactile mode. In one embodiment, the tactile mode and input mode are independent, in other embodiments the tactile mode and input mode may be run simultaneously. In the input mode, the handheld device is configured for a user to input a plurality of commands via the user interface for controlling characteristics of the sound waves and output by the headphones. In the input mode, the handheld device may also be configured for controlling the haptic feedback output by the pad of the handheld controller. The haptic feedback may be provided by a shaker or other haptic motor configured within the handheld device. In the tactile mode, the handheld device is configured for providing tactile sensations associated with the virtual reality environment.

In other embodiments, the computer system is configured such that the microphone processing module is configured to receive audio commands from the first user for controlling the vibrations and sound waves output by the headset. Additionally, the sound processing module may be configured to allow a user to control or navigate an avatar within a virtual reality environment.

In one embodiment, the headset can be configured to be powered by an external power source. In other embodiments, the headset may be adapted to be powered by a battery pack. In other embodiments, the remote handheld device is adapted to be powered by the battery pack.

The external power source maybe the utility grid, solar power, external battery power, battery pack, or any other means known to those skilled in the art. Additionally, the remote handheld device may be also adapted to be powered by an external power source The external power source maybe the utility grid, solar power, external battery power, battery pack, or any other means known to those skilled in the art.

Similarly, second user or consumer 111 may navigate a second avatar within a certain virtual reality environment. The computer system of the present invention will provide second user sound data, as illustrated in step 808. The sound data may include, a second user avatar position within the virtual reality environment, sound pitch, quality, loudness, position of object, depth, range, perspective and distance of the actual sound as if it existed in the natural originating environment or within a virtual reality environment.

The sound processing modules will then define the first and second avatar position, calculate the first distance, calculate the first positioning, and then calculates the second emitting orientation for each the first and second avatars. Next, the system will provide the sound data corresponding to the virtual reality environment in which the avatars are operating to the first user 102 as illustrated in step 806 and to the second user 111 as illustrated in step 810.

The sound processing modules of the headsets of the computer systems of both the first and second users will provide the sound waves that correspond the sound data to the first second users.

Figure 9:
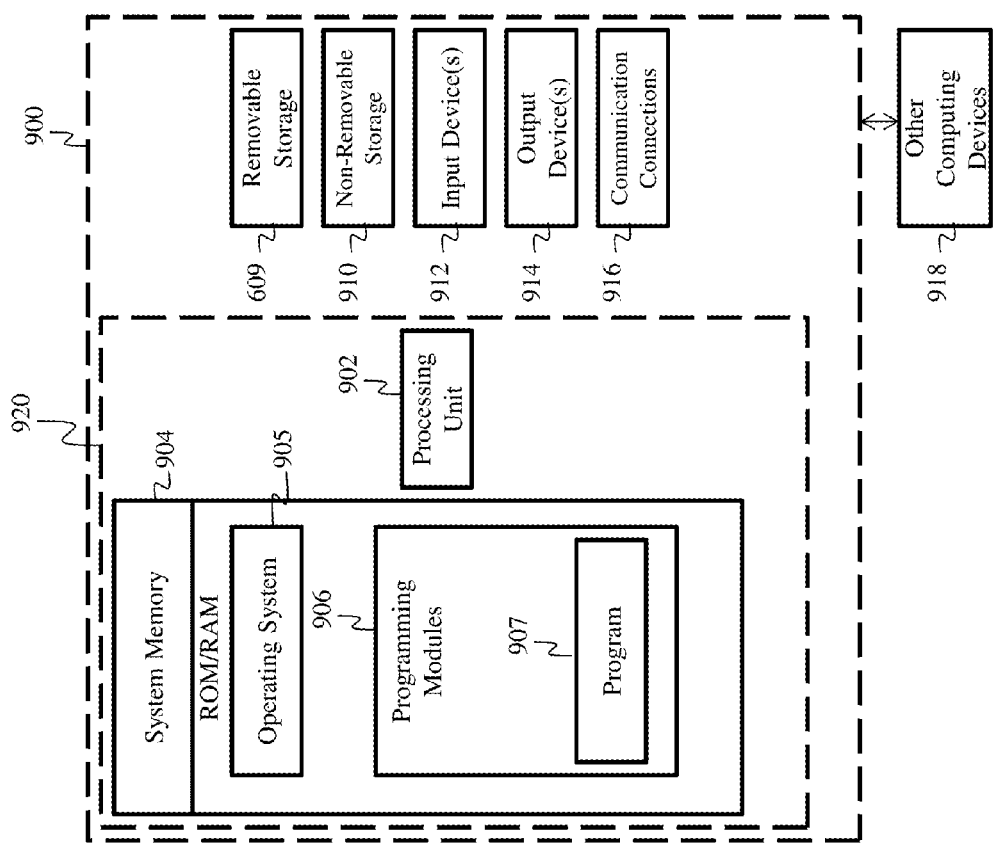

FIG. 9 is a block diagram of a system including an example computing device that be used as terminals 104, 110 and computer systems 106, 112. Consistent with the embodiments described herein, the aforementioned actions may be implemented in a computing device, such as the computing device 900 of FIG. 9. Any suitable combination of hardware, software, or firmware may be used to implement the computing device 900. The aforementioned system, device, and processors are examples and other systems, devices, and processors may comprise the aforementioned computing device. Furthermore, computing device 900 may comprise an operating environment for devices and systems, as described above. Process 500, 550, 600, 700, 800 may operate in other environments and are not limited to computing device 900.

With reference to FIG. 9, a system consistent with an embodiment of the invention may include a plurality of computing devices, such as computing device 900. In a basic configuration, computing device 900 may include at least one processing unit 902 and a system memory 904. Depending on the configuration and type of computing device, system memory 904 may comprise, but is not limited to, volatile (e.g. random access memory (RAM)), non-volatile (e.g. read-only memory (ROM)), flash memory, or any combination or memory. System memory 904 may include operating system 905, and one or more programming modules 906. Operating system 905, for example, may be suitable for controlling computing device 900's operation. In one embodiment, programming modules 906 may include, for example, a program module 907 for executing the actions of the device. Furthermore, embodiments of the invention may be practiced in conjunction with a graphics library, other operating systems, or any other application program and is not limited to any particular application or system. This basic configuration is illustrated in FIG. 3 by those components within a dashed line 920.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by a removable storage 909 and a non-removable storage 910. Computer storage media may include volatile and nonvolatile, removable and non-removable media implemented in any method or technology for storage of information, such as computer readable instructions, data structures, program modules, or other data. System memory 904, removable storage 909, and non-removable storage 910 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 900. Any such computer storage media may be part of device 900. Computing device 900 may also have input device(s) 912 such as a keyboard, a mouse, a pen, a sound input device, a camera, a touch input device, etc. Output device(s) 914 such as a display, speakers, a printer, etc. may also be included. The aforementioned devices are only examples, and other devices may be added or substituted.

Computing device 900 may also contain a communication connection 916 that may allow device 900 to communicate with other computing devices 918, such as over a network in a distributed computing environment, for example, an intranet or the Internet. Communication connection 916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 904, including operating system 905. While executing on processing unit 902, programming modules 906 (e.g. program module 907) may perform processes including, for example, one or more of the stages of the process 500, 550, 600, 600, or 800 as described above. The aforementioned processes are examples, and processing unit 902 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

A such as although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer system communicatively coupled with a communications network, the computer system for interacting within a virtual reality environment, comprising:
   a headset configured to be placed on a user's head, comprising:
      a headband having a first end opposing a second end and configured to sit on top of a user's head,
      an ear cup attached to each end of the headband, wherein each ear cup includes a driver configured to receive an audio signal having a plurality of channels, and a transmitting device for outputting a plurality of sound waves based on the audio signal received,
      a microphone communicatively coupled with the headband, wherein the microphone is configured for a) receiving a plurality of sound waves, b) converting the plurality of sound waves into an audio signal, and
c) transmitting the audio signal to a microphone processing module in the headset;
a sound processing module configured for a) receiving a plurality of sound data corresponding with a sound profile, via the communications network, associated with a virtual reality environment, b) processing said plurality of sound data, c) converting said plurality of sound data into a set of audio signals each having a plurality of channels, d) transmitting each audio signal to each driver of each ear cup;
wherein the sound data includes data for representing a first distance, a first positioning, and a second object emitting orientation, wherein the first distance is a perceived dimension between a first avatar position of said user and a second avatar position of a second sound emitting object, wherein first positioning is where the first avatar position is orientated relative to the second avatar position, and wherein the second emitting orientation is a direction sound emanates from the second sound emitting object;
a microphone processing module for a) receiving a microphone audio signal from the microphone, b) processing the microphone audio signal and converting the microphone audio signal into a voice data packet, c) transmitting said voice data packet, via the communications network, for presenting on a emitting device at each terminal of a plurality of terminals;
a headset haptic device adapted for a) receiving a plurality of audio signals corresponding with said sound profile associated with the virtual reality environment, each audio signal having a plurality of channels, b) converting the plurality of audio signals into a haptic profile corresponding to the sound profile, c) transmitting vibrations corresponding with the haptic profile from the headset haptic device through the headband to the crown of the user's skull and from each ear cup to the skull around each user's ears;
a boom having a first end and a second end, the first end of the boom configured to attach proximate to one of the ear cups, wherein the microphone is configured to attach at the second end of a boom; and,
a remote handheld device in communication with the headset comprising a pad having a user interface, wherein the remote handheld device includes an input mode and a tactile mode, wherein in the tactile mode the handheld device is configured for providing tactile sensations associated with the virtual reality environment; and,
wherein in the input mode the handheld device is configured for a user to input a plurality of commands via the user interface for controlling characteristics of the sound waves and vibrations output by headphones.

2. The computer system of claim 1, wherein the headset comprises a user interface that is configured for controlling characteristics of the sound waves and vibrations output by headphones.

3. The computer system of claim 1, wherein in the tactile mode the handheld device is configured to provide a user with a plurality of tactile sensations via the pad.

4. The computer system of claim 3, wherein the user interface of the handheld device is configured for controlling the plurality of tactile sensations output by the handheld device.

5. The computer system of claim 1, wherein the microphone processing module is configured to receive audio commands for controlling the vibrations and sound waves output by the headset.

6. The computer system of claim 1, wherein the sound data of the sound profile further includes environment data corresponding to a geometric shape, dimensions and material comprising a virtual reality environment.

7. The computer system of claim 2, wherein the vibrations and the sound emanating from the headset have a plurality of phases and intensities corresponding to the sound profile of the virtual reality environment.

8. The computer system of claim 1, wherein the headset and remote handheld device are configured to be powered by an external power source.

9. The computer system of claim 1, wherein the headset and remote handheld device are configured to be powered by at least one battery.

10. The computer system of claim 1, the sound processing module is further configured for:
defining a first avatar position, wherein the first avatar position corresponds to said user within the virtual reality environment;
defining a second avatar position, wherein the second avatar position corresponds to said second user within the virtual reality environment;
calculating data representing a first distance, wherein the first distance corresponds to a perceived dimension between the first avatar position and second avatar position;
calculating data representing a first positioning, wherein the first positioning corresponds to where the first avatar position is orientated relative to the second avatar position; and,
calculating data representing a second emitting orientation, wherein the second emitting orientation corresponds is a direction sound emanates from the second sound emitting object.

11. A computer system communicatively coupled with a communications network, the computer system for interacting within a virtual reality environment, comprising:
a headset configured to be placed on a user's head, comprising:
a headband having a first end opposing a second end and configured to sit on top of a user's head,
an ear piece attached to each end of the headband, wherein each ear piece includes a driver to receive an audio signal having a plurality of channels, and a transmitting device for outputting a plurality of sound waves based on the audio signal received,
a microphone communicatively coupled with the headband, wherein the microphone is configured for a) receiving a plurality of sound waves, b) converting the plurality of sound waves into an audio signal, and c) transmitting the audio signal to a microphone processing module in the headset;
a sound processing module configured for a) receiving a plurality of sound data corresponding with a sound profile, via the communications network, associated with a virtual reality environment, b) processing said plurality of sound data, c) converting said plurality of sound data into a set of audio signals each having a plurality of channels, d) transmitting each audio signal to each driver of each ear piece;
wherein the sound data includes data for representing a first distance, a first positioning, and a second object emitting orientation, wherein the first distance is a perceived dimension between a first avatar position of said user and a second avatar position of a second sound emitting object, wherein first positioning is where the first avatar position is orientated relative to the second avatar position, and wherein the second emitting orientation is a direction sound emanates from the second sound emitting object;

a microphone processing module for a) receiving a microphone audio signal from the microphone, b) processing the microphone audio signal and converting the microphone audio signal into a voice data packet, c) transmitting said voice data packet, via the communications network, for presenting on an emitting device at each terminal of a plurality of terminals;

a headset haptic device adapted for a) receiving a plurality of audio signals corresponding with said sound profile associated with the virtual reality environment, each audio signal having a plurality of channels, b) converting the plurality of audio signals into a haptic profile corresponding to the sound profile, c) transmitting vibrations corresponding with the haptic profile from the headset haptic device through the headband to the crown of the user's skull and from each ear piece to the skull around each user's ears;

wherein the headset comprises a user interface that is configured for controlling characteristics of the sound waves and vibrations output by headphones; and, a boom having a first end and a second end, the first end of the boom configured to attach proximate to one of the ear pieces, wherein the microphone is configured to attach at the second end of the boom.

12. The computer system of claim 11, wherein the system includes a remote handheld device in communication with the headset comprising a pad having a user interface, wherein the remote handheld device includes an input mode and a tactile mode, wherein in the tactile mode the handheld device is configured to provide the user with a plurality of tactile sensations associated with the virtual reality environment via the pad, and wherein in the input mode the handheld device is configured for a user to input a plurality of commands via the user interface for controlling characteristics of the sound waves and vibrations output by headphones and vibrations output by the handheld device.

13. The computer system of claim 12, wherein the remote handheld device includes at least one shaker.

14. The computer system of claim 13, wherein the sound data of the sound profile further includes environment data corresponding to a geometric shape, dimensions and material comprising a virtual reality environment.

15. The computer system of claim 14, wherein the vibrations and the sound emanating from the headset have a plurality of phases and intensities corresponding to the sound profile of the virtual reality environment.

16. The computer system of claim 1, wherein the headset is in wireless communication with remote handheld device.

17. A computer system communicatively coupled with a communications network, the computer system, comprising:

a headset configured to be placed on a user's head, comprising:
a headband having a first end opposing a second end and configured to sit on top of a user's head,
an ear cup attached to each end of the headband, wherein each ear cup includes a driver to receive an audio signal having a plurality of channels, and a transmitting device for outputting a plurality of sound waves based on the audio signal received,
a sound processing module configured for a) receiving a plurality of sound data corresponding with a sound profile, via the communications network, b) processing said plurality of sound data, c) converting said plurality of sound data into a set of audio signals each having a plurality of channels, d) transmitting each audio signal to each driver of each ear cup;
wherein the sound data includes data for representing a first distance, a first positioning, and a second object emitting orientation, wherein the first distance is a dimension between a first avatar position of said user and a second avatar position of a second sound emitting object, wherein first positioning is where the first position is orientated relative to the second avatar position, and wherein the second emitting orientation is a direction sound emanates from the second sound emitting object;
a headset haptic device adapted for a) receiving a plurality of audio signals corresponding with said sound profile associated with the virtual reality environment, each audio signal having a plurality of channels, b) converting the plurality of audio signals into a haptic profile corresponding to the sound profile, c) transmitting vibrations corresponding with the haptic profile from the headset haptic device through the headband to the crown of the user's skull and from each ear cup to the skull around each user's ears; and
wherein the headset comprises a user interface that is configured for controlling characteristics of the sound waves and vibrations output by the headphones.

18. The computer system of claim 17, wherein the sound data of the sound profile further includes environment data corresponding to a geometric shape, dimensions and material of an environment.

19. A computer system of claim 17, wherein the system further comprises a remote controller in communication with the headset, wherein the remote controller comprises a user interface and includes an input mode, wherein in the input mode the remote controller is configured for a user to input a plurality of commands via the user interface for controlling characteristics of the sound waves and vibrations output by headphones.

20. The computer system of claim 19, wherein the remote controller further includes a tactile mode, wherein in the tactile mode the remote controller is configured to provide the user with a plurality of tactile sensations associated with an environment via a pad.

* * * * *